United States Patent
Campbell et al.

(10) Patent No.: US 7,565,341 B2
(45) Date of Patent: Jul. 21, 2009

(54) AUTOMATICALLY CONFIGURING A SERVER TO SUPPORT DIFFERENT TYPES OF FILE ACCESSES

(75) Inventors: Heather A. Campbell, Los Gatos, CA (US); Larry D. Wadford, Alameda, CA (US); Angela Cheung, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 281 days.

(21) Appl. No.: 11/431,788

(22) Filed: May 10, 2006

(65) Prior Publication Data

US 2007/0282853 A1   Dec. 6, 2007

(51) Int. Cl.
*G06F 7/30*   (2006.01)
*G06F 15/173*   (2006.01)

(52) U.S. Cl. ............... 707/1; 707/9; 707/10; 709/223; 709/224

(58) Field of Classification Search .............. 707/1, 707/9, 10; 709/203–204, 220, 223–224
See application file for complete search history.

(56) References Cited

U.S. PATENT DOCUMENTS

| | | | | |
|---|---|---|---|---|
| 5,596,745 A * | 1/1997 | Lai et al. | ............... | 707/103 R |
| 5,737,536 A * | 4/1998 | Herrmann et al. | ........... | 709/229 |
| 5,771,354 A * | 6/1998 | Crawford | .................... | 709/229 |
| 5,778,368 A * | 7/1998 | Hogan et al. | .................. | 707/10 |
| 6,029,203 A * | 2/2000 | Bhatia et al. | ................ | 709/244 |
| 6,067,551 A * | 5/2000 | Brown et al. | ................ | 707/203 |
| 6,092,049 A * | 7/2000 | Chislenko et al. | ............. | 705/10 |
| 6,094,659 A * | 7/2000 | Bhatia | ...................... | 707/104.1 |
| 6,330,547 B1 * | 12/2001 | Martin | ........................ | 705/38 |
| 6,687,698 B1 * | 2/2004 | Nixon et al. | .................. | 707/10 |
| 6,947,389 B1 * | 9/2005 | Chen et al. | .................. | 370/252 |
| 7,058,696 B1 * | 6/2006 | Phillips et al. | .............. | 709/217 |
| 7,127,460 B2 * | 10/2006 | Nixon et al. | .................. | 707/8 |
| 7,136,903 B1 * | 11/2006 | Phillips et al. | .............. | 709/217 |
| 7,162,695 B2 * | 1/2007 | Zemore et al. | ............. | 715/709 |
| 7,231,362 B2 * | 6/2007 | Wilce et al. | .................... | 707/4 |
| 7,337,095 B2 * | 2/2008 | Reuter | ........................... | 703/1 |

(Continued)

OTHER PUBLICATIONS

"Modeling Jobs in a Distributed System"—R. A. MeBride and E. A. Unger—Proceedings of the 1983 ACM SIGSMALL Symposium on Personal and Small Computers—1983 ACM (pp. 32-41).*

(Continued)

*Primary Examiner*—John E Breene
*Assistant Examiner*—Anh Ly
(74) *Attorney, Agent, or Firm*—Park, Vaughan & Fleming LLP

(57) ABSTRACT

One embodiment of the present invention provides a system that automatically configures a server to support different types of file accesses. During operation, the system determines whether a file should be accessed in multi-user mode, wherein multiple users can simultaneously access the file through the server. The system also determines whether the server is configured to support multi-user access to the file. If the file should be accessed in multi-user mode, and if the server is not configured to support multi-user access to the file, the system configures the server to support multi-user access to the file, thereby eliminating the need for the user to manually configure the server to support multi-user access to the file.

18 Claims, 3 Drawing Sheets

U.S. PATENT DOCUMENTS

| | | | |
|---|---|---|---|
| 7,434,166 B2* | 10/2008 | Acharya et al. | 715/740 |
| 2002/0035577 A1* | 3/2002 | Brodersen et al. | 707/201 |
| 2002/0069369 A1* | 6/2002 | Tremain | 713/201 |
| 2002/0109665 A1* | 8/2002 | Matthews et al. | 345/156 |
| 2002/0152472 A1* | 10/2002 | Istvan et al. | 725/117 |
| 2002/0165864 A1* | 11/2002 | Azagury et al. | 707/10 |
| 2003/0004952 A1* | 1/2003 | Nixon et al. | 707/10 |
| 2003/0105816 A1* | 6/2003 | Goswami | 709/204 |
| 2003/0217171 A1* | 11/2003 | Von Stuermer et al. | 709/231 |
| 2004/0117358 A1* | 6/2004 | von Kaenel et al. | 707/3 |
| 2004/0249885 A1* | 12/2004 | Petropoulakis et al. | 709/204 |
| 2005/0085936 A1* | 4/2005 | Reuter | 700/97 |
| 2005/0114490 A1* | 5/2005 | Redlich et al. | 709/223 |
| 2005/0165788 A1* | 7/2005 | Yang et al. | 707/10 |
| 2006/0063645 A1* | 3/2006 | Chiang | 482/8 |
| 2006/0167925 A1* | 7/2006 | Smith et al. | 707/102 |
| 2007/0005693 A1* | 1/2007 | Sampath et al. | 709/204 |
| 2007/0113270 A1* | 5/2007 | Kraemer et al. | 726/4 |
| 2007/0237096 A1* | 10/2007 | Vengroff et al. | 370/254 |

OTHER PUBLICATIONS

"Controlling Concurrent Accesses in an Object-Oriented Environment"—Carmelo Malta and Jose Martinez—Proceedings of te 2nd Int'l Symposium on DABasase Systems for Advanced Applications (DASFA'91), Tokyo, Japan, Apr. 2-4, 1991, (pp. 192-200 or 1-10).*

* cited by examiner

| | MULTI-USER MODE | SINGLE-USER MODE |
|---|---|---|
| LOCAL FILE | HOSTING LOCAL FILES ONLY | NOT-HOSTING MODE |
| REMOTE FILE | HOSTING LOCAL AND REMOTE FILES | NOT-HOSTING MODE | ns
AUTOMATICALLY CONFIGURING A SERVER TO SUPPORT DIFFERENT TYPES OF FILE ACCESSES

BACKGROUND

Field of the Invention

The present invention generally relates to the client-server computer systems.

Computer-based applications often access data which is stored in files. For example, a financial application typically operates on data which is stored in a "company file." As such applications become increasingly more sophisticated, significant advantages can be gained by moving from a simple company file to a more-sophisticated database system, which is controlled by a database server. Using a more-sophisticated database system can provide improved performance and scalability, especially for larger company files and simultaneous users.

However, it is typically necessary to configure a database server to operate in specific modes depending upon what types of file accesses are desired. For example, it may be necessary to configure the database server to access a remote file, or to support multi-user accesses to a file. This can be a problem because application users are typically not very knowledgeable about the technical details involved in configuring a database server. Hence, it is can be very challenging for a typical application user to know what configuration is necessary and then to configure a database server appropriately.

SUMMARY

One embodiment of the present invention provides a system that automatically configures a server to support different types of file accesses. During operation, the system determines whether a file should be accessed in multi-user mode, wherein multiple users can simultaneously access the file through the server. The system also determines whether the server is configured to support multi-user access to the file. If the file should be accessed in multi-user mode, and if the server is not configured to support multi-user access to the file, the system configures the server to support multi-user access to the file, thereby eliminating the need for the user to manually configure the server to support multi-user access to the file.

In a variation on this embodiment, in order to determine whether the file should be accessed in multi-user mode, the system determines whether the file is open in multi-user mode. The system also determines whether a client application, which is attempting to access the file through the server, is in multi-user mode. If the file is open in multi-user mode or the client application is in multi-user mode, the system determines that the file should be accessed in multi-user mode.

In a variation on this embodiment, configuring the server to support multi-user access to the file involves automatically configuring the server to enter a "hosting mode," which supports network connections to multiple clients, whereby the server can use the multiple network connections to facilitate multi-user access to the file.

In a variation on this embodiment, configuring the server to support multi-user access to the file involves automatically prompting the user to obtain permission from the user before configuring the server to support multi-user access to the file.

In a variation on this embodiment, the system also determines whether the file is a remote file (which is located on a different machine from the server), and whether the server is configured to access a remote file. If the file is a remote file and the server is not configured to access a remote file, the system configures the server to access a remote file.

In a further variation, configuring the server to access a remote file involves automatically configuring the server to run as a process which is able to access remote files.

In a further variation, configuring the server to access a remote file involves automatically prompting the user to obtain permission from the user before configuring the server to access a remote file.

In a variation on this embodiment, the server is a database server and the file is a database file.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

System

Figures 1, 2:
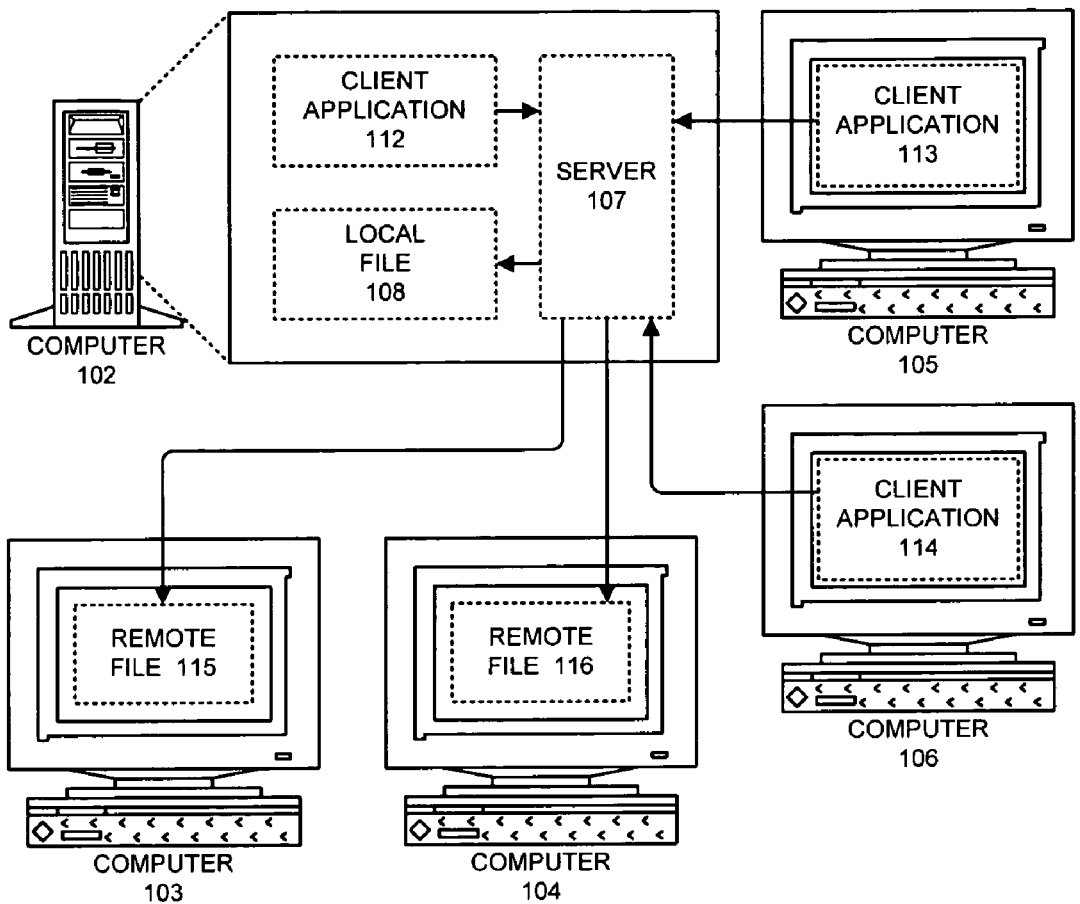
FIG. 1 illustrates how client applications access files through a server in accordance with an embodiment of the present invention.
FIG. 2 illustrates hosting modes which are required to support different types of file accesses in accordance with an embodiment of the present invention.

FIG. 1 illustrates how client applications access files through a server in accordance with an embodiment of the present invention. FIG. 1 illustrates a number of computer systems 102-106. Computer systems 102-106 can generally include any type of computer system, including, but not limited to, a computer system based on a microprocessor, a mainframe computer, a digital signal processor, a distributed computing system, a portable computing device, a personal organizer, a device controller, and a computational engine within an appliance.

Computer system 102 includes a server 107, which includes a mechanism for servicing requests from clients for computational and/or data storage resources.

A number of client applications 112-114 communicate with server 107. In general, client applications 112-114 contain computational capability and a mechanism for communicating with a server. More specifically, client application 112 is a local application, which resides on the same computer system as server 107, whereas client applications 113 and 114 are remote applications, which reside on remote computer systems 105 and 106, respectively, which are located remotely from server 107.

Server 107 accesses a number of files 108, 115 and 116. File 108 is a local file which resides on the same computer system as server 107, whereas files 115 and 116 are remote files which reside on remote computer systems 103 and 104, respectively.

In one embodiment of the present invention, server 107 is a database server and files 108, 115 and 116 are database files.

Hosting Modes

FIG. 2 illustrates hosting modes which are required to support different types of file accesses in accordance with an embodiment of the present invention. The grid which appears in FIG. 2 contains two rows and two columns. The first row is associated with a "local file" and the second row is associated with a "remote file." The first column is associated with "multi-user mode," whereas the second column is associated with "single-user mode."

Cells within the grid illustrate which hosting modes are used for various cases. More specifically, if a local file is to be accessed in multi-user mode, the server should ideally be in "hosting-local-files-only mode." Similarly, if a remote file is to be accessed in multi-user mode, the server should ideally be in "hosting-local-and-remote-files mode." On the other hand, if a local file or a remote file is to be accessed in single-user mode, the server should ideally be in "not-hosting mode."

One embodiment of the present invention provides three different hosting modes, which are illustrated FIG. 2. These hosting modes include: (1) not-hosting mode, (2) hosting-local-files-only mode, and (3) hosting-local-and-remote-files mode.

In not-hosting mode the server runs as a normal process, and is able to access local and remote files. Not-hosting mode does not support multi-user access to files. In not-hosting mode, client applications communicate with the server through shared memory. Hence, only client applications running on the same machine as the server can communicate with the server. (Note that this is the default mode because most users operate solely in single-user mode and do not want to be bothered about hosting.)

In hosting-local-files-only mode, the server runs as a service. This mode supports multi-user access to files located on the same machine as the server. In this mode, the server can use TCP/IP to communicate with client applications. Hence, client applications running on remote machines can communicate with the server.

In hosting-local-and-remote-files mode, the server runs as a normal process, and is able to access local and remote files, because it runs as the logged-in user. This mode also supports multi-user access to files. In this mode, the server can use TCP/IP to communicate with client applications. Hence, client applications running on remote machines can communicate with the server.

Configuring the Server

In one embodiment of the present invention, the server is configured (or reconfigured) whenever certain events occur. For example, the server can be configured (or reconfigured) whenever: (1) a file is created; (2) a file is opened, or (3) a file is switched from single-user mode to multi-user mode. Note that the code within the client application (or alternatively code that works alongside the client application) configures the server. This frees the application user from having to manually perform configuration operations. The decisions involved in configuring the server are described in more detail below with reference to the flow charts which appear in FIGS. 3-5.

Starting in Not-Hosting Mode

Figure 3:
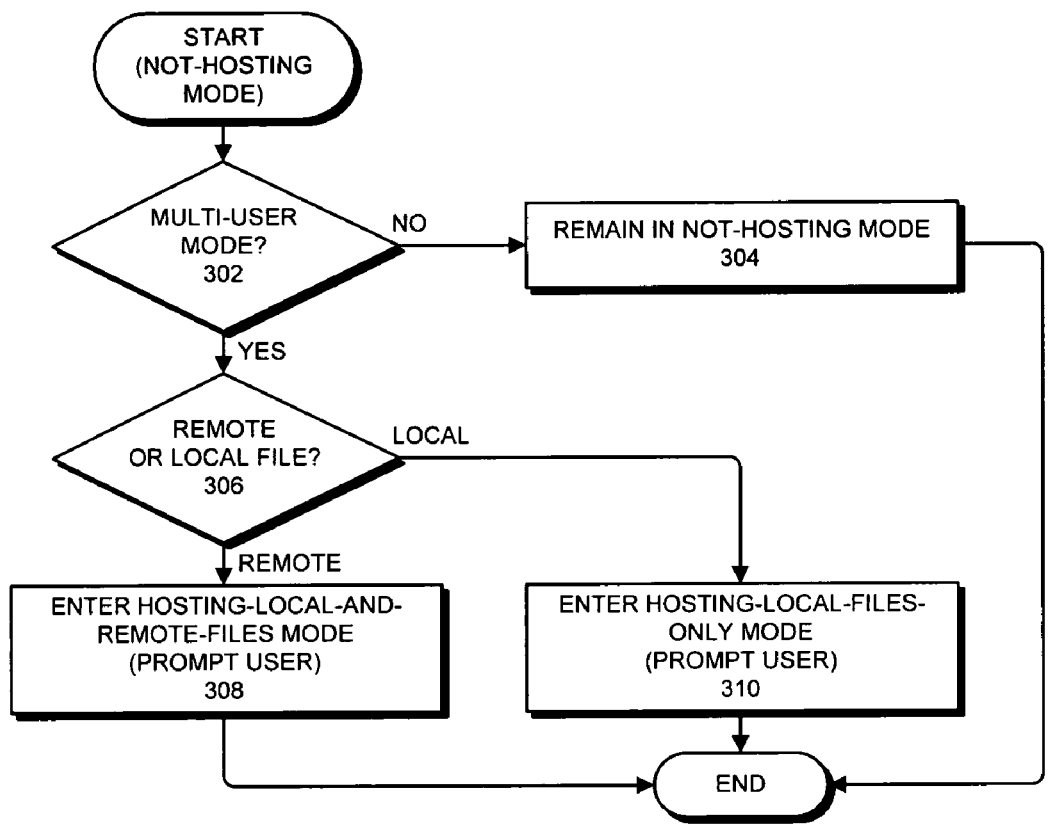
FIG. 3 presents a flow chart illustrating how a server is configured when the server starts in not-hosting mode in accordance with an embodiment of the present invention.

FIG. 3 presents a flow chart illustrating how a server is configured when the server starts in not-hosting mode in accordance with an embodiment of the present invention. The system first determines whether the file should be accessed in multi-user mode (step 302). In one embodiment of the present invention, this involves determining whether the file is open in multi-user mode, or whether a client application, which is attempting to access the file through the server, is in multi-user mode. If the file is open in multi-user mode or the client application is in multi-user mode, the system determines that the file should be accessed in multi-user mode.

If the file is not to be accessed in multi-user mode, the system remains in not-hosting mode (step 304). Otherwise, if the file is to be accessed in multi-user mode, the system determines whether the file is a local file or a remote file (step 306). This can be determined by examining the reference (or handle) for the file. If the file is a remote file, the system enters hosting-local-and-remote-files mode (step 308). Before entering this mode, the system can prompt the user to obtain permission from the user before configuring the server to enter hosting-local-and-remote-files mode.

On the other hand, if the file is a local file the system enters hosting-local-files-only mode (step 310). Before entering this mode, the system can prompt the user to obtain permission from the user before configuring the server to enter hosting-local-files-only mode.

Starting in Hosting-Local-Files-Only Mode

Figure 4:
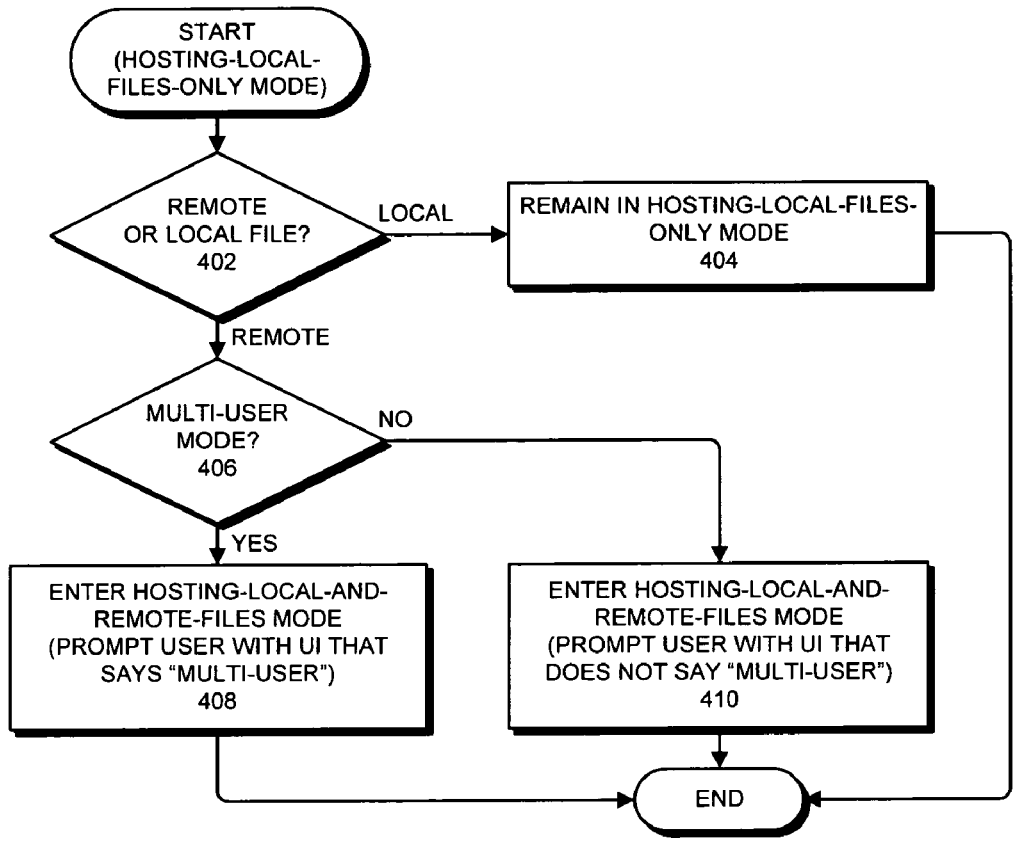
FIG. 4 presents a flow chart illustrating how a server is configured when the server starts in hosting-local-files-only mode in accordance with an embodiment of the present invention.

FIG. 4 presents a flow chart illustrating how a server is configured when the server starts in hosting-local-files-only mode in accordance with an embodiment of the present invention. The system first determines whether the file is a local file or a remote file (step 402). If the file is a local file, the system remains in hosting-local-files-only mode (step 404).

Otherwise, if the file is a remote file, the system determines whether the file should be accessed in multi-user mode (step 406). If the file is to be accessed in multi-user mode, the system enters hosting-local-and-remote-files mode (step 408). Before entering this mode, the system can prompt the user to obtain permission from the user before configuring the server to enter hosting-local-and-remote-files mode. (Note that this prompt mentions multi-user mode.)

On the other hand, if the file is not to be accessed in multi-user mode, the system also enters hosting-local-and-remote-files mode (step 410), except in this case the prompt that is displayed to the user does not mention multi-user mode.

Starting in Hosting-Local-And-Remote-Files Mode

Figure 5:
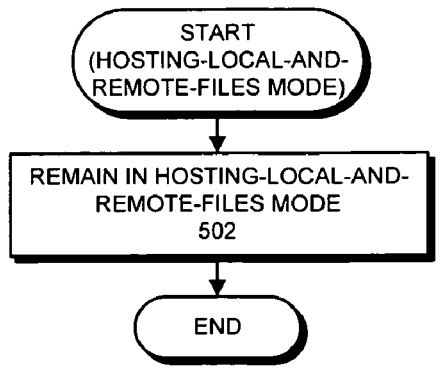
FIG. 5 presents a flow chart illustrating how a server is configured when the server starts in hosting-local-and-remote-files mode in accordance with an embodiment of the present invention.

FIG. 5 presents a flow chart illustrating how a server is configured when the server starts in hosting-local-and-remote-files mode in accordance with an embodiment of the present invention. In this case, the system remains in hosting-local-and-remote-files mode and the configuration of the server is not changed (step 502).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for automatically configuring a server to support different types of file accesses, on a computer system having a memory and a processor, comprising:
    automatically determining a mode in which a file should be accessed through the server;
    automatically determining whether the server is configured to support multi-user access to the file; and
    wherein when it is determined that the file should be accessed in multi-user mode, wherein multiple users can simultaneously access the file through the server, and when it is determined that the server is not configured to support multi-user access to the file, automatically configuring the server to support multi-user access to the file, wherein automatically configuring the server to support multi-user access to the file involves:
    automatically configuring the server to enter a "hosting mode," which supports network connections to multiple clients, whereby the server can use the multiple network connections to facilitate multi-user access to the file; and
    automatically prompting a user to obtain permission from the user before configuring the server to support multi-user access to the file; thereby eliminating the need for a-the user to manually configure the server to support multi-user access to the file.

2. The method of claim 1, wherein automatically determining whether the file should be accessed in multi-user mode involves:
    determining whether the file is open in multi-user mode;
    determining whether a client application, which is attempting to access the file through the server, is in multi-user mode; and
    if the file is open in multi-user mode or the client application is in multi-user mode, determining that the file should be accessed in multi-user mode.

3. The method of claim 1, further comprising:
    automatically determining whether the file is a remote file;
    automatically determining whether the server is configured to access a remote file;
    if the file is a remote file and if the server is not configured to access a remote file, automatically configuring the server to access a remote file.

4. The method of claim 3, wherein automatically configuring the server to access a remote file involves automatically configuring the server to run as a process which is able to access remote files.

5. The method of claim 3, wherein automatically configuring the server to access a remote file involves automatically prompting the user to obtain permission from the user before configuring the server to access a remote file.

6. The method of claim 1, wherein the server is a database server and the file is a database file.

7. A computer-readable storage medium storing instructions that when executed by a computer cause the computer to perform a method for automatically configuring a server to support different types of file accesses, the method comprising:
    automatically determining whether a file should be accessed through the server;
    automatically determining whether the server is configured to support multi-user access to the file; and
    wherein when it is determined that the file should be accessed in multi-user mode, wherein multiple users can simultaneously access the file through the server, and when it is determined that the server is not configured to support multi-user access to the file, automatically configuring the server to support multi-user access to the file, wherein automatically configuring the server to support multi-user access to the file involves:
    automatically configuring the server to enter a "hosting mode," which supports network connections to multiple clients, whereby the server can use the multiple network connections to facilitate multi-user access to the file; and
    automatically prompting a user to obtain permission from the user before configuring the server to support multi-user access to the file;
    thereby eliminating the need for the user to manually configure the server to support multi-user access to the file.

8. The computer-readable storage medium of claim 7, wherein automatically determining whether the file should be accessed in multi-user mode involves:
    determining whether the file is open in multi-user mode;
    determining whether a client application, which is attempting to access the file through the server, is in multi-user mode; and
    if the file is open in multi-user mode or the client application is in multi-user mode, determining that the file should be accessed in multi-user mode.

9. The computer-readable storage medium of claim 7, further comprising:
    automatically determining whether the file is a remote file;
    automatically determining whether the server is configured to access a remote file;
    if the file is a remote file and if the server is not configured to access a remote file, automatically configuring the server to access a remote file.

10. The computer-readable storage medium of claim 9, wherein automatically configuring the server to access a remote file involves automatically configuring the server to run as a process which is able to access remote files.

11. The computer-readable storage medium of claim 9, wherein automatically configuring the server to access a remote file involves automatically prompting the user to obtain permission from the user before configuring the server to access a remote file.

12. The computer-readable storage medium of claim 7, wherein the server is a database server and the file is a database file.

13. A computer system that includes a server, and that automatically configures the server to support different types of file accesses, comprising:
    a processor;
    memory;
    an analysis mechanism embedded in the computer system configured to determine a mode in which a file should be accessed through the server;
    wherein the analysis mechanism is additionally configured to determine whether the server is configured to support multi-user access to the file; and
    a configuration mechanism embedded in the computer system, wherein when it is determined that the file should be accessed in multi-user mode, wherein multiple users can simultaneously access the file through the server, and when it is determined that the server is not configured to support multi-user access to the file, the configuration mechanism configures the server to support multi-user access to the file, wherein while configuring the server to support multi-user access to the file, the configuration mechanism further configures the server to:

enter a "hosting mode," which supports network connections to multiple clients, whereby the server can use the multiple network connections to facilitate multi-user access to the file; and to prompt a user to obtain permission from the user before configuring the server to support multi-user access to the file;

thereby eliminating the need for the user to manually configure the server to support multi-user access to the file.

14. The apparatus of claim 13, wherein while determining whether the file should be accessed in multi-user mode, the analysis mechanism is configured to:

determine whether the file is open in multi-user mode;

determine whether a client application, which is attempting to access the file through the server, is in multi-user mode; and if the file is open in multi-user mode or the client application is in multi-user mode, to determine that the file should be accessed in multi-user mode.

15. The computer system of claim 13, wherein the analysis mechanism is additionally configured to determine whether the file is a remote file, and whether the server is configured to access a remote file; and wherein if the file is a remote file and if the server is not configured to access a remote file, the configuration mechanism configures the server to access a remote file.

16. The computer system of claim 15, wherein configuring the server to access a remote file involves configuring the server to run as a process which is able to access remote files.

17. The computer system of claim 15, wherein while configuring the server to access a remote file, the configuration mechanism prompts the user to obtain permission from the user before configuring the server to access a remote file.

18. The computer system of claim 13, wherein the server is a database server and the file is a database file.

* * * * *

UNITED STATES PATENT AND TRADEMARK OFFICE
CERTIFICATE OF CORRECTION

PATENT NO.          : 7,565,341 B2
APPLICATION NO.     : 11/431788
DATED               : July 21, 2009
INVENTOR(S)         : Heather A. Campbell et al.

Page 1 of 1

It is certified that error appears in the above-identified patent and that said Letters Patent is hereby corrected as shown below:

In claim 1 (at column 5, line 32), please delete the word "a" and the symbol "-" at the beginning of the line so that it reads: "the user to manually configure the server to support".
   In claim 14 (at column 7, line 15), please replace the word "apparatus" with the words –computer system—so that the line reads: "The computer system of claim 13, wherein while determining".

Signed and Sealed this

Twentieth Day of October, 2009

David J. Kappos
*Director of the United States Patent and Trademark Office*